April 19, 1938.   B. TSUMURA   2,114,407
APPARATUS FOR TREATING MYOPIA
Filed Oct. 21, 1935
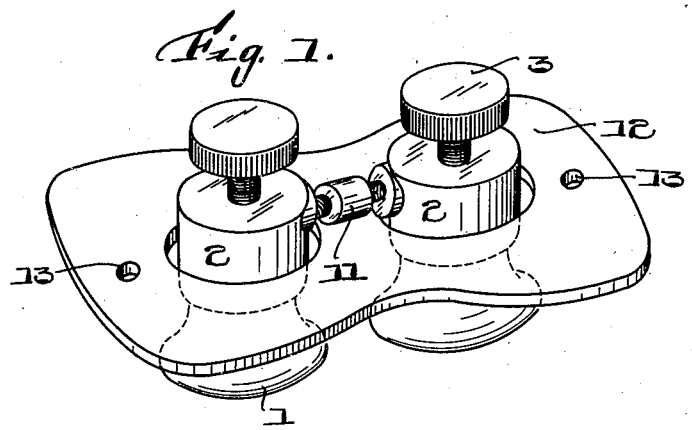
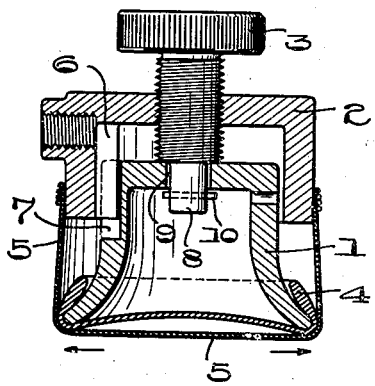   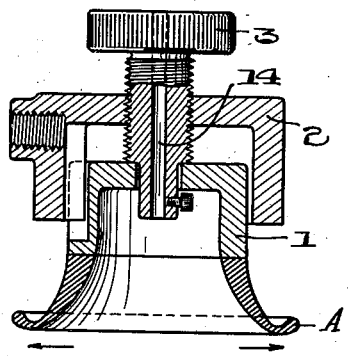
INVENTOR.
B. Tsumura
BY
ATTORNEYS.

Patented Apr. 19, 1938

2,114,407

UNITED STATES PATENT OFFICE 2,114,407

APPARATUS FOR TREATING MYOPIA

Bunjiro Tsumura, Shibuya-ku, Tokyo, Japan

Application October 21, 1935, Serial No. 46,037
In Japan October 27, 1934

2 Claims. (Cl. 128—25)

The present invention relates to an apparatus for treating myopia, which consists in fitting an annular-edged eyelid presser slidably into a casing and covering said annular edge, namely the part contacting with the eyelid, with a rubber sheet. The object thereof is to treat myopia completely and safely by extending the eyelid uniformly towards the outer periphery from its center and in the meantime applying necessary pressure in the direction normal to the eyeball and thus pressing and flattening the protruded thickened eyeball lens.

Referring to the appended drawing,

Figure 1 is a perspective view of the apparatus for treating myopia according to the present invention;

Figure 2 is a longitudinal section of its essential parts and

Figure 3 is a longitudinal view of the same having a different rubber part.

In the drawing, 1 is an eyelid presser with its lower portion spreading outward to form a ring, while its upper portion is fitted slidably in a casing 2. 6 is a projection on the inner surface of the casing and fitted in a groove 7 at the outside of the eyelid presser 1 so as to prevent the rotation of the above presser 1 with regard to the casing 2.

3 is a screw fitted in the threaded hole at the center of the top of the casing 2, and a short shaft 8 formed at its lower end is inserted rotatably in the upper perforation 9 of the eyelid presser 1 and is held in position by means of a pin 10. 4 is a cover of thick soft rubber attached to the end of the eyelid presser; and 5, a thin rubber sheet covering the under surface of 4 and having its outer periphery turned up and fixed to the outer periphery of the casing 2.

The right and left casings 2 are connected together by means of a turn buckle 11 in such a manner that the distance between them may be adjusted freely and are also connected to a mask 12 which is made in a suitable shape to cover the upper part of the face and has small holes 13 at the right and left sides for an elastic band or a tie to be passed through to allow this device to be held in a suitable position by being tied to the head.

If instead of stretching the thin rubber sheet from the outer periphery of the casing the annular edge of the eyelid presser 1 is made of thick rubber material as shown in Figure 3 and is applied to the eyelid and the presser 1 is extended outwardly by the screw 3, the rubber edge A will be spread outward to press the eyelid. Accordingly, the rubber central portion may be dispensed with.

In this case, the position of the eyelid presser with regard to the eyeball may be changed suitably by making the screw hollow and peeping through such hollow 14.

To use this device, after adjusting suitably the distance between the two casings 2 by means of the turn buckle 11, the thin rubber sheet 5 is applied to the eyelid and then the screw 3 is turned, whereupon the eyelid presser 1 slides outward and the rubber sheet 5 begins to press the eyeball, at the same time being extended towards the outer periphery from its center to extend the contacting eyelid uniformly towards the outer periphery from its center. On this occasion, the cover 4 of thick soft rubber does the work of facilitating the extension and movement of the rubber sheet 5. As the tension due to the extension of the said rubber sheet 5 produces pressure upon the eyeball, the slightest turning of the screw 3 would produce comparatively great pressure.

Thus, with this apparatus it is possible to apply large or small pressure as is desired in the direction normal to the eyeball, extending the eyeball uniformly towards the outer periphery from its center. Further, if the eyelid presser 1 is made of rubber and shaped so that its edge becomes extended outwardly when pressed against the eyelid, the rubber sheet may be extended more strongly.

This device, if used during sleep for 7 to 8 hours every night for several weeks, will show a remarkable effect, and slight near-sightedness is sometimes relieved in only several days.

Moreover, by varying the tension of the rubber sheet of the lower portion of the eyelid presser 1 according to the direction, it is possible to remedy astigmatism.

Both logic and experiment show that the eyeball lens pressed from outside is supported from inside and becomes flattened to lengthen the focal distance and the protruded lens is pressed down to be brought a little near the retina, so that this device has a double effect in treating myopia just as, when a branch of a living tree is bent gradually, the cell of the side which has received the tension is easy to develop in the direction of the tension and the cell of the side which has undergone pressure has its development checked in the direction from where it has received the pressure. Especially, the cell of the lens in the eyeball maintained in a flat state by applying pressure for a long time during sleep grows physically till it becomes flatter by vital reaction. Also, the curve of the cornea of the eyeball is somewhat reduced to shorten the distance between the front and back of the eyeball, thus enabling myopia to be treated safely and radically.

I claim:

1. An apparatus for treating myopia comprising in combination an eyelid presser slidably mounted upon a casing, a thin rubber sheet covering said eyelid presser and connected to the outer periphery of said casing, a screw for driving said presser inwardly or outwardly of said casing and means for adjustably connecting a pair of said casings.

2. An apparatus for treating myopia comprising in combination an eyelid presser slidably mounted upon a casing, a thin rubber sheet covering said eyelid presser and connected around the periphery of said casing with varying tension according to the direction of user's axis of astigmatism, a screw for adjustably connecting a pair of said casings.

BUNJIRO TSUMURA.